United States Patent
Yamada et al.

(10) Patent No.: US 9,653,722 B2
(45) Date of Patent: May 16, 2017

(54) PRISMATIC SECONDARY BATTERY

(71) Applicant: SANYO Electric Co., Ltd., Moriguchi-shi, Osaka (JP)

(72) Inventors: Masakazu Yamada, Osaka (JP); Takayuki Hattori, Hyogo (JP); Yohei Muroya, Hyogo (JP); Yasuhiro Yamauchi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 262 days.

(21) Appl. No.: 14/192,338

(22) Filed: Feb. 27, 2014

(65) Prior Publication Data

US 2014/0242440 A1    Aug. 28, 2014

(30) Foreign Application Priority Data

Feb. 28, 2013    (JP) ................................ 2013-038064

(51) Int. Cl.
     *H01M 2/04*      (2006.01)
     *H01M 2/30*      (2006.01)
     (Continued)

(52) U.S. Cl.
     CPC ............. *H01M 2/305* (2013.01); *H01M 2/06* (2013.01); *H01M 2/0217* (2013.01); *H01M 10/0431* (2013.01); *H01M 2220/20* (2013.01)

(58) Field of Classification Search
     CPC ....... H01M 2/02–2/0217; H01M 2/04–2/0426; H01M 2/0456;
     (Continued)

(56) References Cited

U.S. PATENT DOCUMENTS 6,268,079 B1 * 7/2001 Inoue .................... H01M 2/065
                                                          429/171
9,225,001 B2 * 12/2015 Hattori ..................... H01M 2/30
                        (Continued)

FOREIGN PATENT DOCUMENTS

JP      2008-251411 A    10/2008
JP      2009-009868 A    1/2009
                 (Continued)

OTHER PUBLICATIONS

Machine Translation of Tsuchiya, JP 2009-259524 (Nov. 2009).*
Machine translation of Nagai JP 2010-033766 (Feb. 12, 2010).*

*Primary Examiner* — Jonathan Crepeau
*Assistant Examiner* — Jacob Buchanan
(74) *Attorney, Agent, or Firm* — Westerman, Hattori, Daniels & Adrian, LLP

(57) ABSTRACT

There is provided a prismatic secondary battery having high reliability and including a connecting part, wherein a terminal member and an external conduction member are connected by a swaged part and a welded part. The terminal member includes a flange, a first connecting part formed on a first surface side of the flange, and a second connecting part formed on a second surface side of the flange. The flange and the second connecting part are disposed on a battery exterior side than a sealing body. The first connecting part penetrates a through-hole formed in the sealing body. The second connecting part penetrates a through-hole formed in an external conduction member. The second connecting part includes a tip part swaged on the external conduction member. An abutting part of a tip of the swaged part of the second connecting part and a protruding part of the external conduction member is weld-connected.

16 Claims, 10 Drawing Sheets

(51) Int. Cl.
 *H01M 10/04* (2006.01)
 *H01M 2/06* (2006.01)
 *H01M 2/02* (2006.01)

(58) Field of Classification Search
 CPC ..... H01M 2/0469–2/0473; H01M 2/06–2/065; H01M 2/20–2/307
 See application file for complete search history.

(56) References Cited

U.S. PATENT DOCUMENTS

| | | | |
|---|---|---|---|
| 2008/0241679 | A1 | 10/2008 | Okutani et al. |
| 2009/0087737 | A1 | 4/2009 | Yamauchi et al. |
| 2009/0202901 | A1* | 8/2009 | Okuda ................ H01M 2/0426 429/175 |
| 2010/0233915 | A1* | 9/2010 | Kim ..................... H01M 2/206 439/754 |
| 2011/0045345 | A1 | 2/2011 | Tsuchiya et al. |
| 2011/0076552 | A1 | 3/2011 | Taniguchi et al. |
| 2011/0177387 | A1 | 7/2011 | Byun et al. |
| 2011/0244281 | A1 | 10/2011 | Byun |
| 2012/0276442 | A1* | 11/2012 | Kim ..................... H01M 2/0473 429/179 |
| 2013/0071726 | A1* | 3/2013 | Kim ..................... H01M 2/043 429/179 |
| 2013/0130100 | A1* | 5/2013 | Kurata .................. H01M 2/024 429/179 |

FOREIGN PATENT DOCUMENTS

| | | | | |
|---|---|---|---|---|
| JP | 2009-087693 A | | 4/2009 | |
| JP | 2009259524 A | * | 11/2009 | ............. H01M 2/04 |
| JP | 2009-283256 A | | 12/2009 | |
| JP | 2010-033766 A | | 2/2010 | |
| JP | 2011-076867 A | | 4/2011 | |
| KR | 101223517 | * | 1/2013 | ............. H01M 2/30 |
| WO | WO 2012011470 A1 | * | 1/2012 | ............. H01M 2/024 |

* cited by examiner

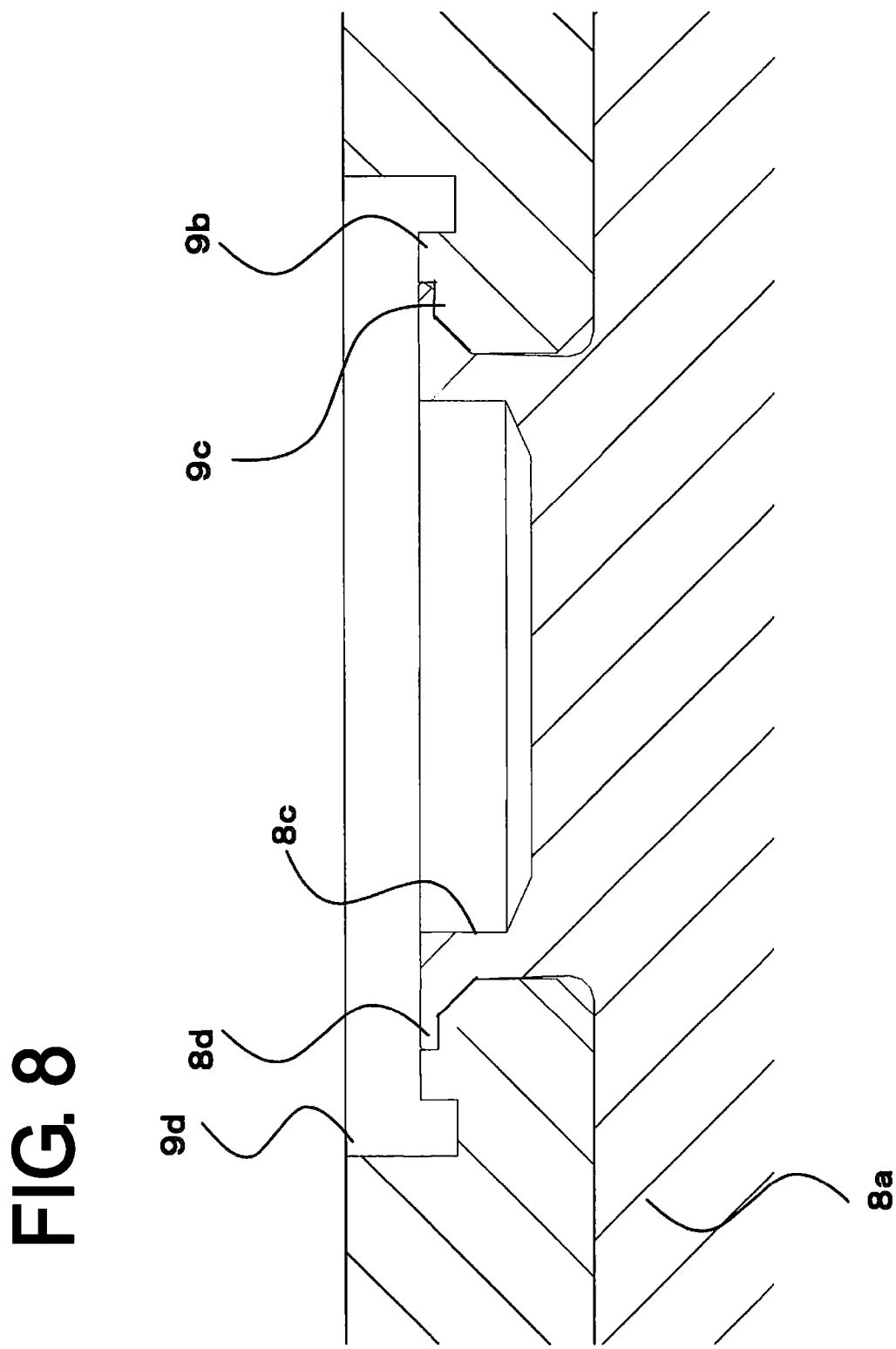

PRISMATIC SECONDARY BATTERY

TECHNICAL FIELD

The present invention relates to a prismatic secondary battery including a connecting part in which a terminal member and an external conduction member are connected by a swaged part and a welded part.

BACKGROUND ART

Secondary batteries used as on-vehicle drive power sources for electric vehicles (EVs) and hybrid electric vehicles (HEVs, PHEVs) or the like have been developed. In the on-vehicle drive power sources, high capacity and high output characteristics are required. A large number of batteries are connected in series or in parallel. Prismatic secondary batteries are widely used for these batteries, because of their space efficiency.

A method for welding a boundary part of a swaged joint portion with high energy beams such as laser beams is proposed as a method for realizing lower resistance in a battery terminal part or a joint part inside a battery.

JP 2010-33766 A discloses a battery including a power-generating element, a battery case storing the power-generating element, an inner conduction member, a terminal member, and a resin spacer. The inner conduction member is disposed in the battery case, is electrically connected to one electrode of the power-generating element, and includes a penetrating connection part penetrating the battery case and protruding to the outside of the battery case, The terminal member is disposed outside the battery case, is welded to the penetrating connection part of the inner conduction member, and forms a welded part melted with the penetrating connection part of the inner conduction member by welding. The resin spacer is interposed between the battery case and at least a battery case side region of the terminal member than the welded part. The penetrating connection part includes an overlapping part overlapping with an outer surface located on a side reverse to the outer surface of the terminal member opposed to the battery case. The welded part is formed in the overlapping part and the terminal member by abutting welding of the overlapping part and the terminal member using energy beams. Thereby, the inner conduction member and the terminal member can be welded while the deterioration of the resin spacer is suppressed.

However, since higher reliability is required for the secondary batteries used for the on-vehicle drive power sources or the like, further improvements in the secondary batteries are desired.

It is an object of the present invention to provide a prismatic secondary battery having further improved reliability.

SUMMARY

A prismatic secondary battery according to an aspect of the present invention includes:

an electrode assembly including a positive electrode plate and a negative electrode plate;

an outer casing having a mouth and housing the electrode assembly;

a sealing body having a through-hole and sealing the mouth of the outer casing;

a terminal member electrically connected to the positive electrode plate or the negative electrode plate and penetrating the through-hole of the sealing body;

an external conduction member having a through-hole and connected to the terminal member; and an insulating member interposed between the terminal member and the sealing body, wherein the terminal member includes a flange, a first connecting part formed on a first surface side of the flange, and a second connecting part formed on a second surface side of the flange, the flange and the second connecting part are disposed on a battery exterior side than the sealing body, the first connecting part penetrates the through-hole of the sealing body, the second connecting part is inserted into the through-hole of the external conduction member, and includes a tip part swaged on the external conduction member, and an abutting part of a tip of the swaged part of the second connecting part and the external conduction member is weld-connected.

Since the terminal member and the external conduction member are connected by the swaged part and the welded part in the prismatic secondary battery according to an aspect of the present invention, the resistance value of the connecting part can be reduced, and the aging variation of the resistance value can be suppressed. Furthermore, since the abutting part of the tip of the swaged part of the second connecting part and the external conduction member is welded, the welded part is stably formed, which results in a further improvement in reliability. The flange of the terminal member exists between the welded part of the terminal member and the external conduction member, and the insulating member interposed between the terminal member and the sealing body. Therefore, the transformation and deformation or the like of the insulating member caused by heat generated during welding can be effectively suppressed.

When the sealing body, the insulating member, and the external conduction member are integrally swaging-fixed by one region of the terminal member, the shape of the swaged part is less likely to be stabilized, and a gap may be generated between the members. On the other hand, in the prismatic secondary battery according to an aspect of the present invention, in the terminal member, a portion inserted into the through-hole of the external conduction member and swaging-fixed, and a portion inserted into the through-hole of the insulating member or the sealing body or the like are separate regions provided on a surface opposite to the flange. For this reason, in the second connecting part inserted into the through-hole of the external conduction member and swaging-fixed, less members have only to be swaging-fixed. Thereby, the shape of the swaged part is likely to be stabilized. Therefore, a variation in the thickness of the swaged part of the terminal member can be suppressed, and the abutting of the tip of the swaged part and the protruding part or the step part provided on the external conduction member can be stably performed. Thereby, the quality of the welded part of the abutting part is stabilized, which provides a battery having higher reliability. The gap can be certainly prevented from being generated among the members such as the terminal member, the insulating member, and the sealing body after swaging, which provides a battery having high sealability. The constitutions of the terminal member and the external conduction member may be applied to at least one of the negative electrode side and the positive electrode side.

In the prismatic secondary battery according to an aspect of the present invention, it is preferable that a first protruding part is provided around the through-hole on a surface of the external conduction member opposite to the sealing body side; and an abutting part of the tip of the swaged part of the second connecting part and the first protruding part is weld-connected.

The first protruding part or the step part is provided on the external conduction member. The tip of the swaged part of the second connecting part abuts on the protruding part or the step part, so that the abutting portion can be weld-connected. Particularly, when the abutting part of the protruding part provided on the external conduction member and the second connecting member is weld-connected, an excellent welded part is formed, which is preferable. Particularly preferably, the protruding part and the step part are annularly provided so as to encircle the through-hole. However, the first protruding part and the step part are not annularly provided, and a plurality of protruding parts can be provided at intervals so as to encircle the through-hole.

In the prismatic secondary battery according to an aspect of the present invention, preferably, a step part encircling the first protruding part is provided outside the first protruding part of the external conduction member.

Thereby, the connecting part of the terminal member and the external conduction member is formed in a recessed part of the external conduction member, which can prevent the damage and breakage of the connecting part caused by the contact of other part and jig or the like with the connecting part during a manufacturing process or use.

In the prismatic secondary battery according to an aspect of the present invention, it is preferable that a second protruding part is provided in the vicinity of the through-hole on a surface of the external conduction member opposite to the sealing body side; and the swaged part of the second connecting part covers the second protruding part.

Thereby, the rotation movement of the external conduction member to the terminal member can be suppressed, which can suppress the damage and breakage of the connecting part. The swaged part may not cover the entire second protruding part. The second protruding part may be provided at at least one place. However, the second protruding parts are preferably provided at intervals at a plurality of places so as to encircle the through-hole. The second protruding part is preferably formed so as to be connected to the protruding part. The height of the second protruding part is preferably lower than that of the first protruding part. The second protruding part is preferably provided on the through-hole side of the external conduction member than the first protruding part.

In the prismatic secondary battery according to an aspect of the present invention, it is preferable that a through-hole side end part of the external conduction member of the second protruding part has an inclined surface. Thereby, the swaged part can stably cover the second protruding part.

In the prismatic secondary battery according to an aspect of the present invention, it is preferable that a recessed part is provided in the vicinity of the through-hole on a surface of the external conduction member opposite to the sealing body side; and the swaged part of the second connecting part covers the recessed part.

Thereby, the rotation movement of the external conduction member to the terminal member can be suppressed, which can suppress the damage and breakage of the connecting part. The swaged part may not cover the entire recessed part. The recessed part may be provided at at least one place. However, the recessed parts are preferably provided at intervals at a plurality of places so as to encircle the through-hole. The recessed part is preferably provided on the through-hole side of the external conduction member than the first protruding part. Preferably, the recessed parts are radially provided from the through-hole side of the external conduction member.

In the prismatic secondary battery according to an aspect of the present invention, preferably, a through-hole side surface of the external conduction member of the first protruding part is an inclined surface or a curved surface. This can prevent a gap from being generated between the swaged part of the second connecting part and a range in the vicinity of the first protruding part in the external conduction member, which can prevent cracks and voids from being generated in the welded part.

BRIEF DESCRIPTION OF THE DRAWINGS

FIG. 7 is a sectional view taken along line IC-IC of FIG. 6A;

FIG. 8 is a sectional view taken along line ID-ID of FIG. 6A, and shows a state where the second connecting part of a negative electrode terminal member is inserted into a through-hole of a negative electrode terminal plate, and a tip of the second connecting part is swaged;

DETAILED DESCRIPTION

Hereinafter, a prismatic secondary battery according to an embodiment of the present invention will be described with reference to the drawings. However, the prismatic secondary battery illustrated below is intended as an illustrative example of a prismatic secondary battery, for the purpose of understanding the technical concept of the invention, and is not intended to specify the invention to the prismatic secondary battery. The invention can be equally applied to variants without departing from the technical concept shown in the claims.

Figure 1:
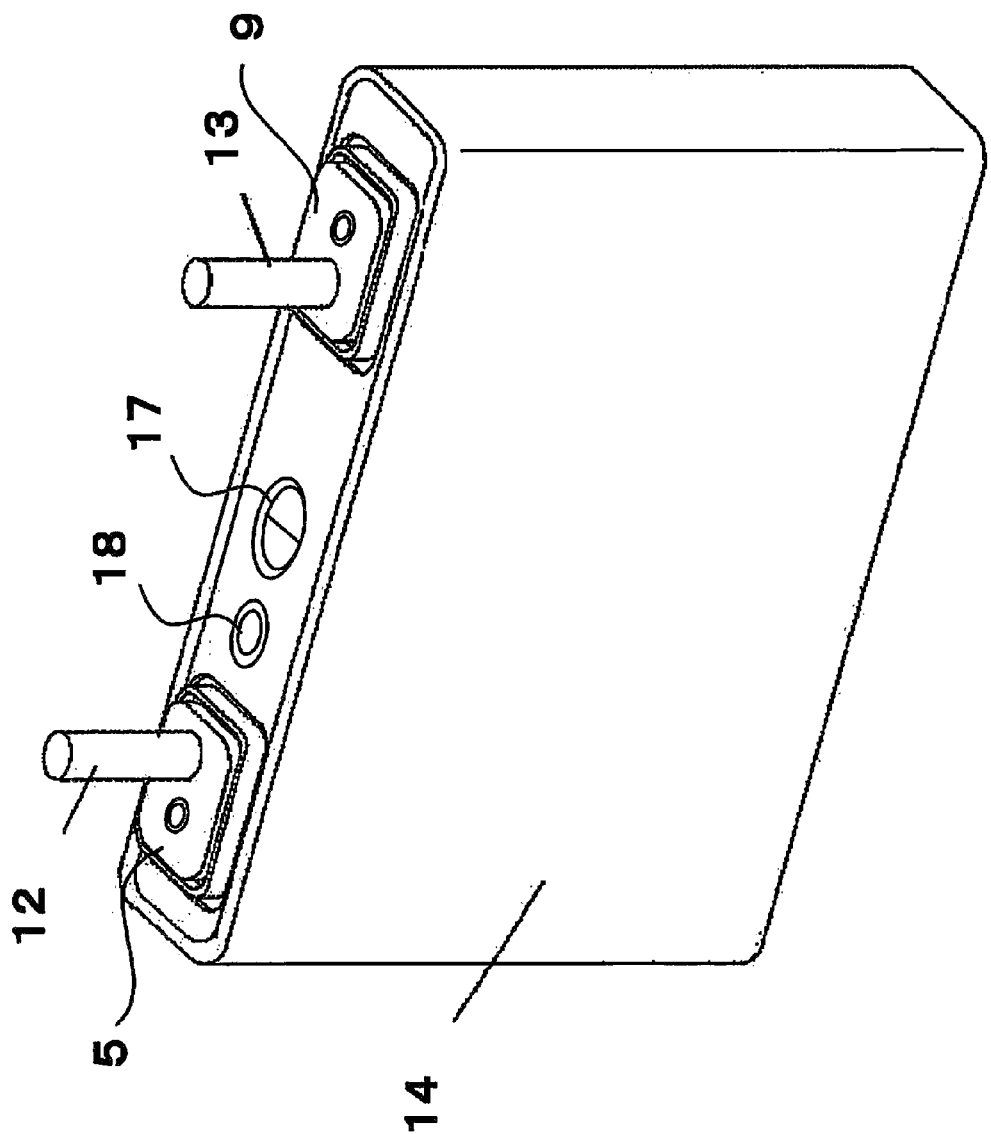
FIG. 1 is a perspective view of a prismatic secondary battery according to an embodiment.

First, a prismatic secondary battery 30 according to an embodiment will be described with reference to FIGS. 1, 2A and 2B. The prismatic secondary battery 30 includes a flattened wound electrode assembly 1 in which a positive electrode plate and a negative electrode plate are wound with separator (all omitted from the drawings) interposed therebetween. The positive electrode plate is produced by applying a positive electrode active material mixture onto both sides of a positive electrode substrate made of an aluminium foil, drying and rolling the resulting object, and thereafter slitting the object at one end so that the aluminum foil is exposed in strips in the lengthwise direction. The negative electrode plate is produced by applying a negative electrode active material mixture onto both sides of a negative electrode substrate made of a copper foil, drying and rolling the resulting object, and thereafter slitting the object at one end so that the copper foil is exposed in strips in the lengthwise direction.

The positive electrode plate and the negative electrode plate obtained as described above are then wound with polyethylene microporous separators interposed therebetween in a state where neither a positive electrode substrate exposed portion 2 of the positive electrode plate nor a negative electrode substrate exposed portion 6 of the negative electrode plate overlap with the active material layer of their opposing electrode. Thereby, a flattened wound electrode assembly 1 is produced, which includes, at one end of the winding axis direction, a plurality of positive electrode substrate exposed portions 2 which are stacked, and at the other end, a plurality of negative electrode substrate exposed portions 6 which are stacked.

The positive electrode substrate exposed portion 2 is electrically connected to a positive electrode terminal member 4 via a positive electrode collector 3. The negative electrode substrate exposed portion 6 is electrically connected to a negative electrode terminal member 8 via a negative electrode collector 7. The positive electrode terminal member 4 is fixed to a sealing body 15 via an insulating member 10. A positive electrode terminal plate 5 including a bolt 12 for external connection is disposed on the positive electrode terminal member 4. The negative electrode terminal member 8 is fixed to the sealing body 15 via the insulating member 11. A negative electrode terminal plate 9 including a bolt 13 for external connection is disposed on the negative electrode terminal member 8. A current interruption mechanism can be interposed between the positive electrode substrate exposed portion 2 and the positive electrode terminal member 4. The current interruption mechanism disconnects a conduction route between the positive electrode substrate exposed portion 2 and the positive electrode terminal member 4 when a pressure in a battery outer casing 14 increases to a certain value or more.

Figure 2A:
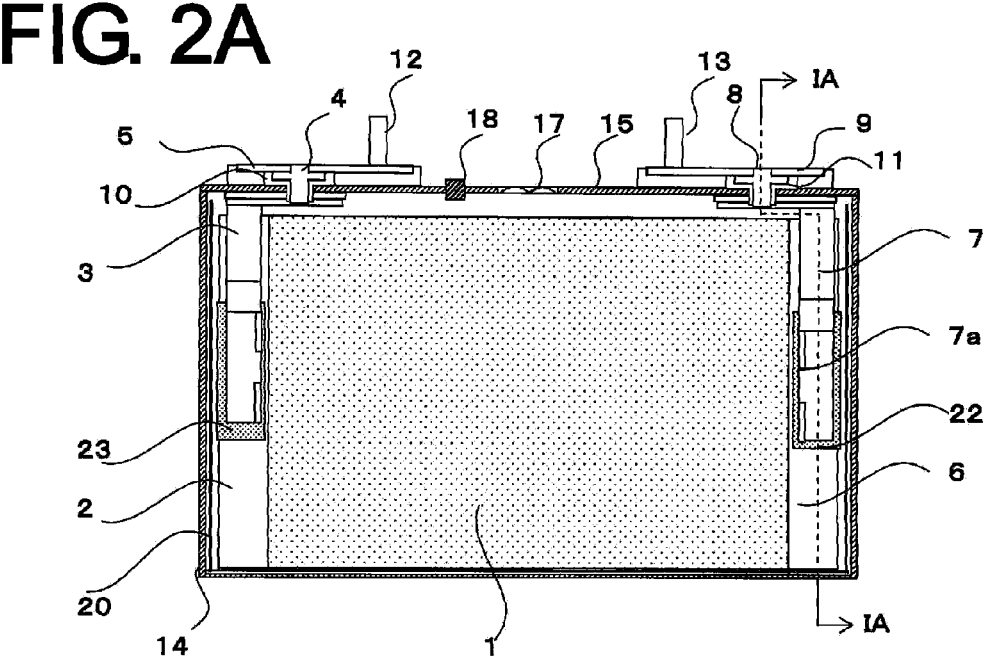
FIG. 2A is a sectional view of the prismatic secondary battery shown in FIG. 1.
Figure 2B:
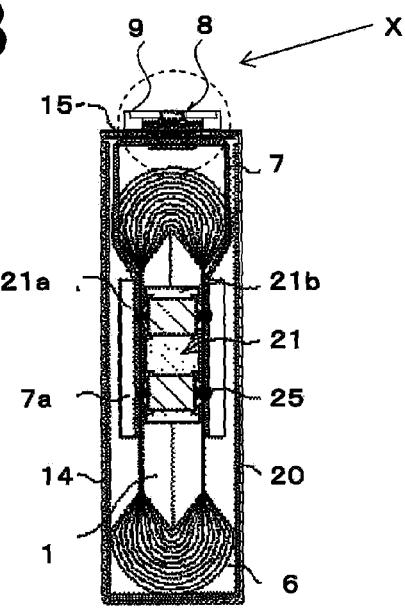
FIG. 2B is a sectional view taken along line IA-IA of FIG. 2A.

As shown in FIG. 2B, an intermediate connection member 21 is disposed in a central part of the wound negative electrode substrate exposed portion 6. In the intermediate connection member 21, two cylindrical intermediate conduction members 21a are held by a holding member 21b made of a resin. Resistance welding is performed in a state where the negative electrode collectors 7 are disposed on both the external surfaces of the wound negative electrode substrate exposed portion 6. Thereby, the negative electrode collector 7, the negative electrode substrate exposed portion 6, and the intermediate conduction member 21a are weld-connected, to form a weld spot 25. A rib 7a is provided on the negative electrode collector 7. The positive electrode side can also have the same constitution as that of the negative electrode side. A plate-like member made of a copper-based metal (copper or a copper alloy) is used as the negative electrode collector 7. A plate-like member made of an aluminium-based metal (aluminium or an aluminium alloy) is used as the positive electrode collector 3. The negative electrode collector 7 and the positive electrode collector 3 are preferably produced by bending the plate-like members. The intermediate conduction member preferably includes a positive electrode side made of an aluminum-based metal and a negative electrode side made of a copper-based metal.

As shown in FIG. 2A, it is preferable that an insulating sheet 22 having a mouth is interposed between the positive electrode substrate exposed portion 2 and the positive electrode collector 3, and an insulating sheet 23 having a mouth is interposed between the negative electrode substrate exposed portion 6 and the negative electrode collector 7. Herein, welding connection between the positive electrode substrate exposed portion 2 and the positive electrode collector 3 and between the negative electrode substrate exposed portion 6 and the negative electrode collector 7 is performed in portions corresponding to the mouths of the insulating sheets 22 and 23. Thereby, when the substrate exposed portion and the collector are weld-connected by resistance welding, a wattless current during welding can be reduced. The generation of sputtering during welding can be suppressed, and the damage of the electrode assembly caused by sputtering can be prevented.

The insulating sheets 22 and 23 are preferably disposed so that the insulating sheets 22 and 23 extend to the outside (battery outer casing 14 side) than the end parts of the positive electrode collector 3 and the negative electrode collector 7, respectively, in the winding axis direction of the wound electrode assembly 1. Furthermore, in the winding axis direction of the wound electrode assembly 1, the insulating sheets 22 and 23 are preferably disposed so that the insulating sheets 22 and 23 extend to the outside (battery outer casing 14 side) than the end parts of the positive electrode substrate exposed portion 2 and the negative electrode substrate exposed portion 6, respectively. It is more preferable that the areas of the insulating sheets 22 and 23 are made larger than the area of a connection range which is in contact with the substrate exposed portions 2 and 6 via the insulating sheets 22 and 23 in the collectors 3 and 7, and the insulating sheets 22 and 23 protrude to the outside from the periphery of the connection range of the collectors 3 and 7.

As shown in FIGS. 2A and 2B, in the prismatic secondary battery 30, the flattened wound electrode assembly 1 is inserted into a prismatic battery outer casing 14, with an insulating electrode assembly cover 20 interposed around the periphery except at the sealing body 15. The sealing body 15 is then laser-welded to the mouth part of the battery outer casing 14. Thereafter, nonaqueous electrolyte is poured in through an electrolyte pour hole and the electrolyte pour hole is sealed by an electrolyte pour hole sealing member 18. The sealing body 15 includes a gas escape valve 17 which is opened when a pressure in the battery outer casing 14 increases. When the current interruption mechanism is provided, an actuation pressure for the gas escape valve 17 is set to a value higher than that for the current interruption mechanism.

Next, constitutions of a connecting part of the collector and the terminal member, and a connecting part of the terminal member and the terminal plate as an external conduction member will be described in accordance with the negative electrode side with reference to FIGS. 3 to 8. The positive electrode side also can have the same constitution as that of the negative electrode side.

Figure 3:
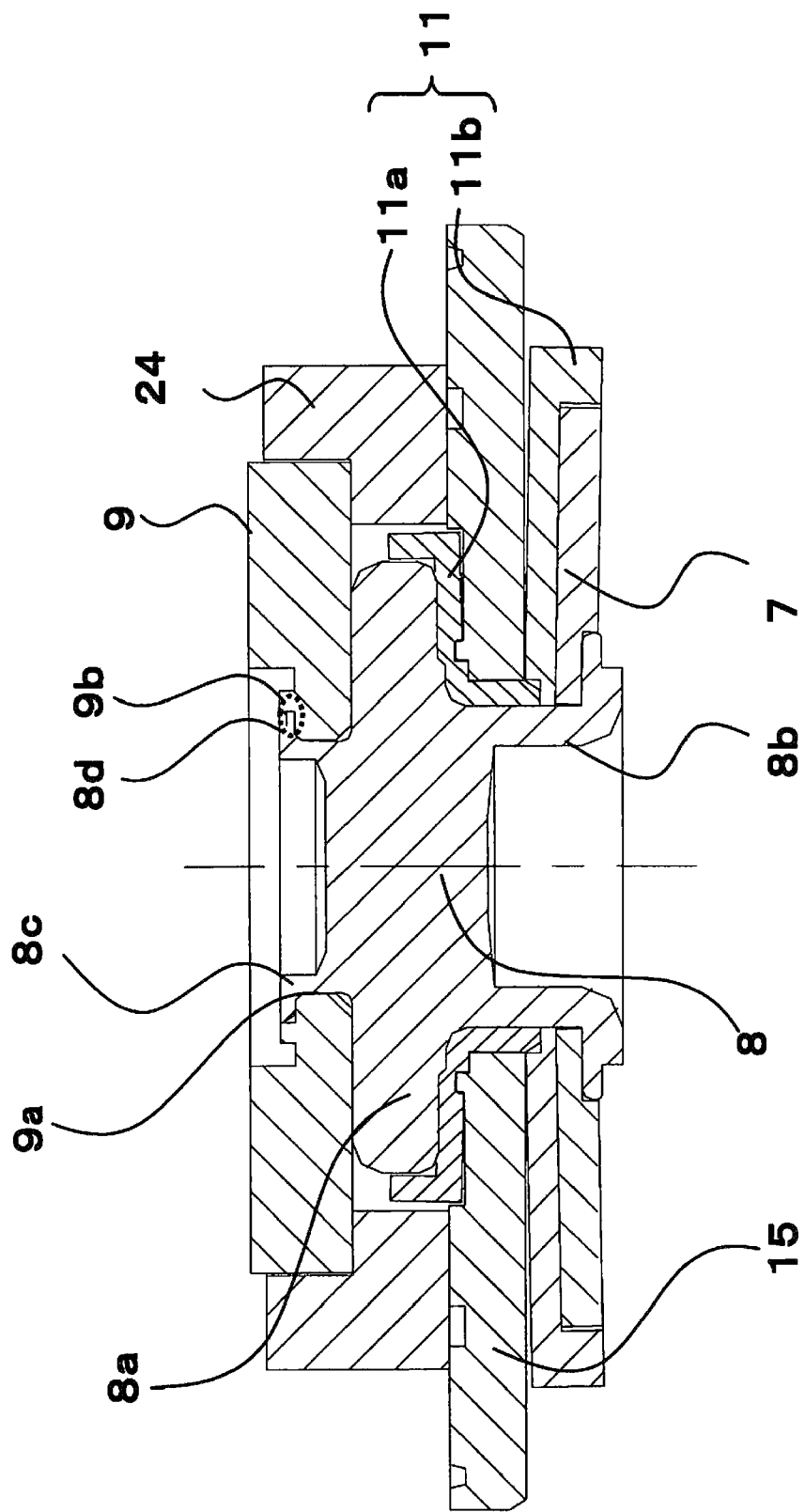
FIG. 3 is an enlarged view of an X portion of FIG. 2B.
Figure 4:
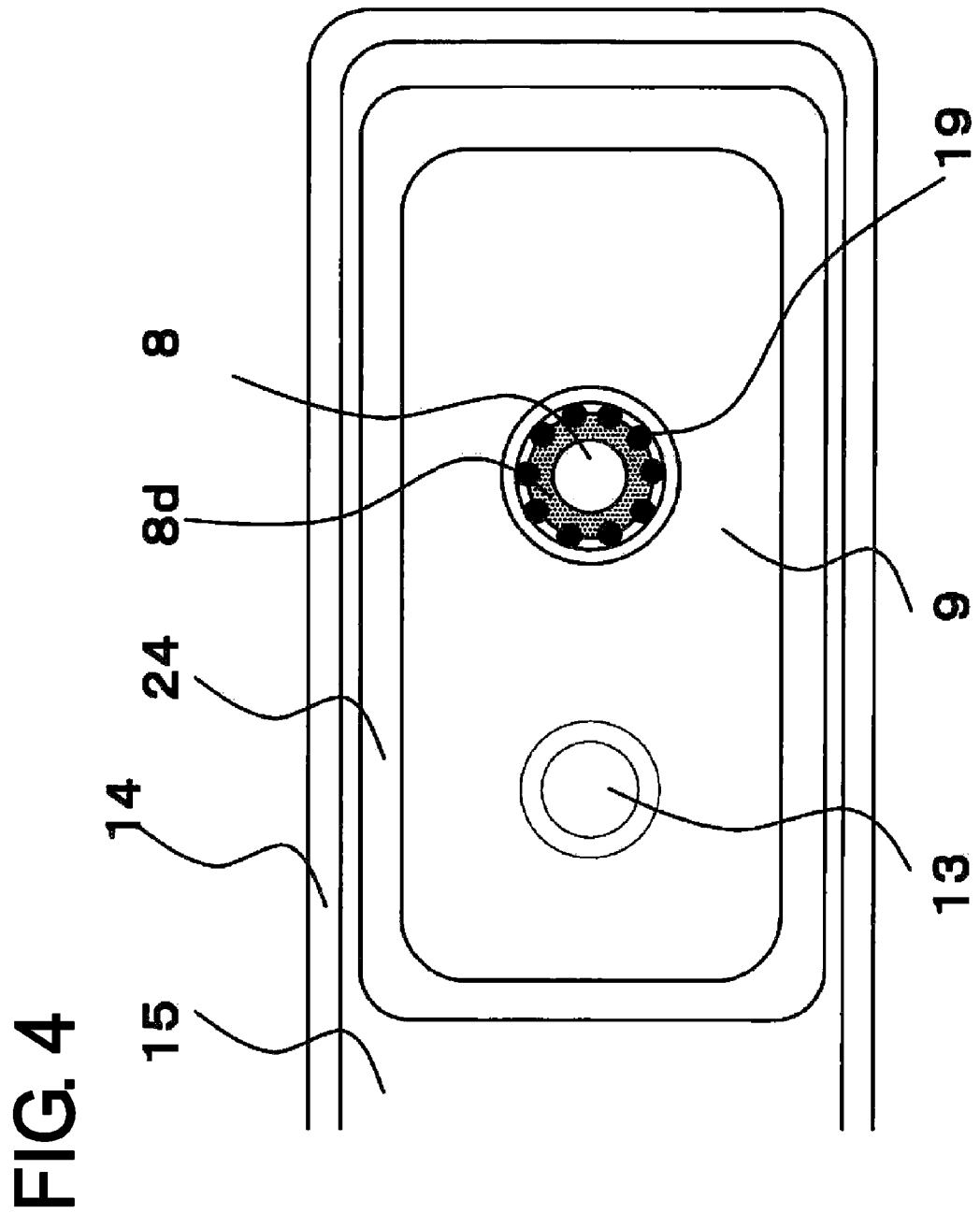
FIG. 4 is a plan view of the X portion of FIG. 2B.
Figure 5A:
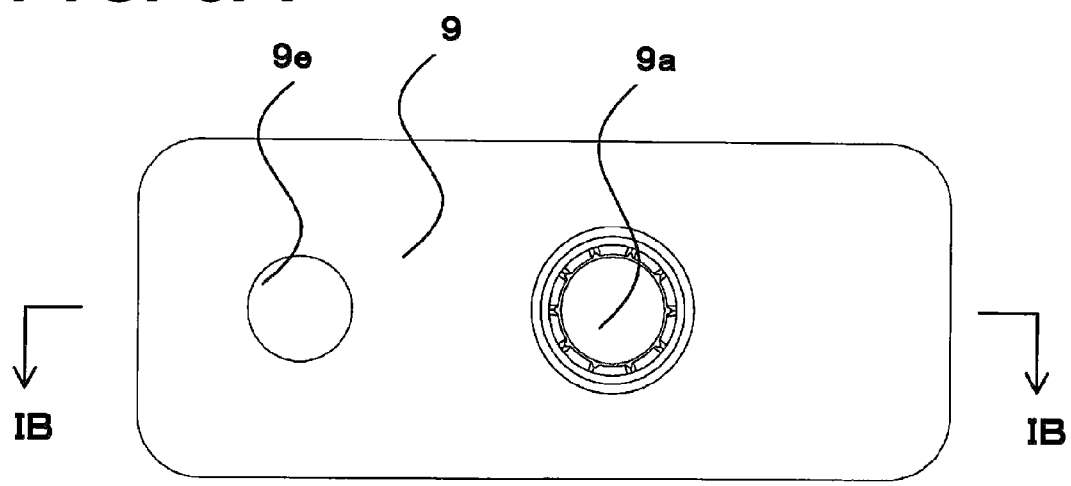
FIG. 5A is a plan view of a negative electrode terminal plate used for a prismatic secondary battery according to an embodiment.
Figure 5B:
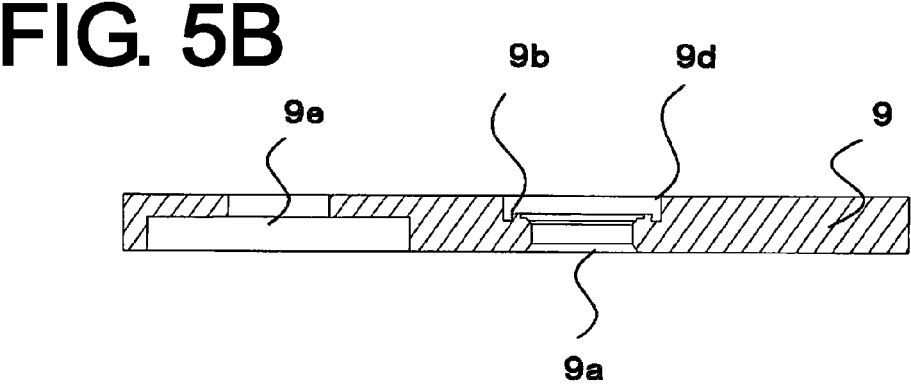
FIG. 5B is a sectional view taken along line IB-IB of FIG. 5A.

As shown in FIG. 3, the negative electrode terminal member 8 is fixed to the sealing body 15 in a state where the negative electrode terminal member 8 is electrically insulated from the sealing body 15 by the insulating member 11. Herein, the insulating member 11 includes an upper insulating member 11a and a lower insulating member 11b. However, the insulating member 11 may include only one part, or may include a plurality of parts. The negative electrode terminal member 8 includes a flange 8a. The flange 8a includes a first connecting part 8b provided on one surface side of the flange 8a and a second connecting part 8c provided on the other surface side. The first connecting part 8b is connected to the negative electrode collector 7 in the battery through a through-hole of the sealing body 15. Herein, a cylindrical body before swaging is used for the first connecting part 8b. A tip of the first cylindrical connecting part 8b is inserted into a through-hole formed in the negative electrode collector 7. The first connecting part 8b and the negative electrode collector 7 are connected to each other by swaging the tip part on the negative electrode collector 7. The swaged part of the first connecting part 8b and the negative electrode collector 7 are more preferably connected by laser welding or the like. A method for connecting the negative electrode terminal member 8 and the negative electrode collector 7 to each other is not limited thereto. The method may be only any one of the swaging and the laser welding. The negative electrode terminal member 8 and the negative electrode collector 7 may be connected to each other with the other conduction member interposed therebetween.

The negative electrode terminal plate 9 is placed on the flange 8a of the negative electrode terminal member 8. A through-hole 9a is formed in the negative electrode terminal plate 9. The second connecting part 8c of the negative electrode terminal member 8 is inserted into the through-hole 9a. A tip part of the second connecting part 8c is swaged on the negative electrode terminal plate 9 by spinning swaging. An abutting part of a tip of a swaged part 8d of the second connecting part 8c and the negative electrode terminal plate 9 is weld-connected by laser welding, to form a weld spot 19. The weld spots 19 are preferably provided at a plurality of places at intervals. A terminal plate holder 24 is interposed between the negative electrode terminal plate 9 and the sealing body 15.

As shown in FIGS. 5A and 5B and FIGS. 6A to 6C, a first annular protruding part 9b is provided so as to encircle the through-hole 9a on a surface of the negative electrode terminal plate 9 opposite to the sealing body 15 side. The annular first protruding part 9b facilitates the abutting between the tip of the swaged part 8d and the first protruding part 9b of the negative electrode terminal plate 9 when the second connecting part 8c of the negative electrode terminal member 8 is swaged. However, the shape of the first protruding part 9b is not limited to the annular shape. A plurality of protruding parts may be disposed so as to encircle the through-hole 9a at intervals.

A second protruding part 9c is provided on the through-hole 9a side than the first protruding part 9b. The second connecting part 8c is swaged on the negative electrode terminal plate 9 so that the swaged part 8d covers the second protruding part 9c. This can prevent the rotation of the negative electrode terminal plate 9 to the negative electrode terminal member 8 even if a force is added in a direction in which the negative electrode terminal plate 9 is rotated to the negative electrode terminal member 8 when the battery is produced or used, which can prevent the damage and breakage of the connecting part of the negative electrode terminal plate 9 and the negative electrode terminal member 8.

Figure 6A:
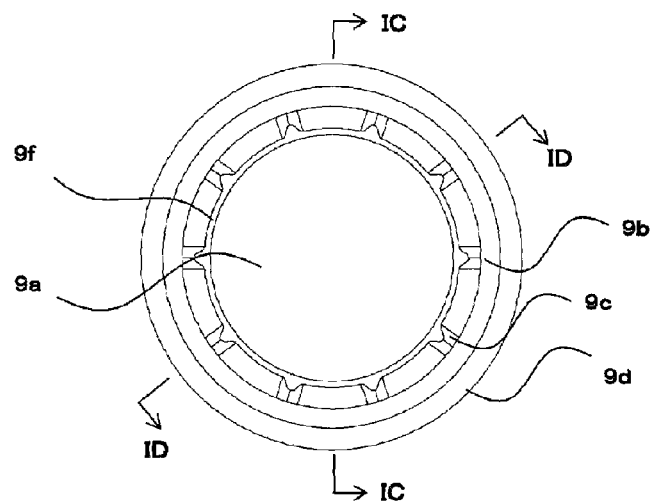
FIG. 6A is a plan view of the vicinity of a through-hole of a negative electrode terminal plate used for a prismatic secondary battery according to an embodiment.
Figure 6B:
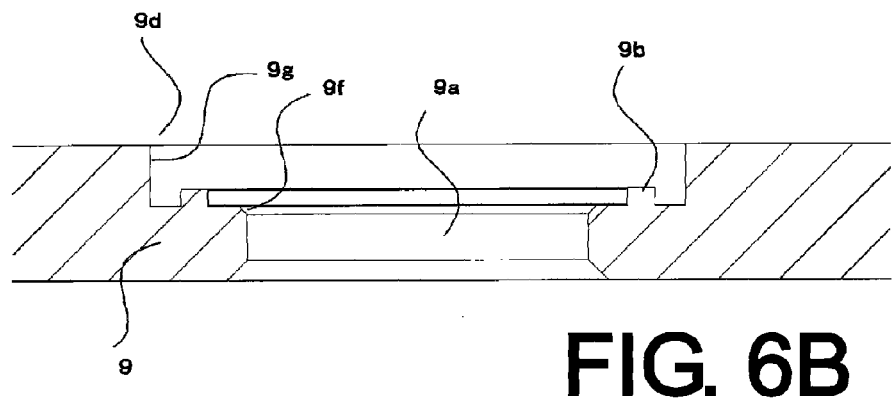
FIG. 6B is a sectional view taken along line IC-IC of FIG. 6A.
Figure 6C:
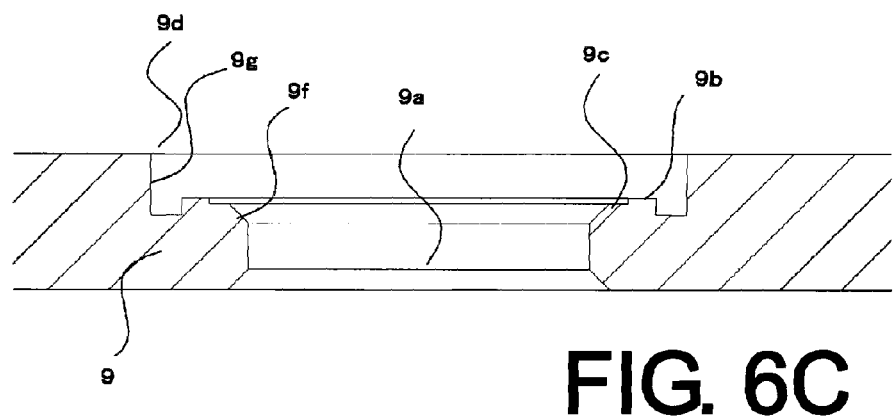
FIG. 6C is a sectional view taken along line ID-ID of FIG. 6A.
Figure 9:
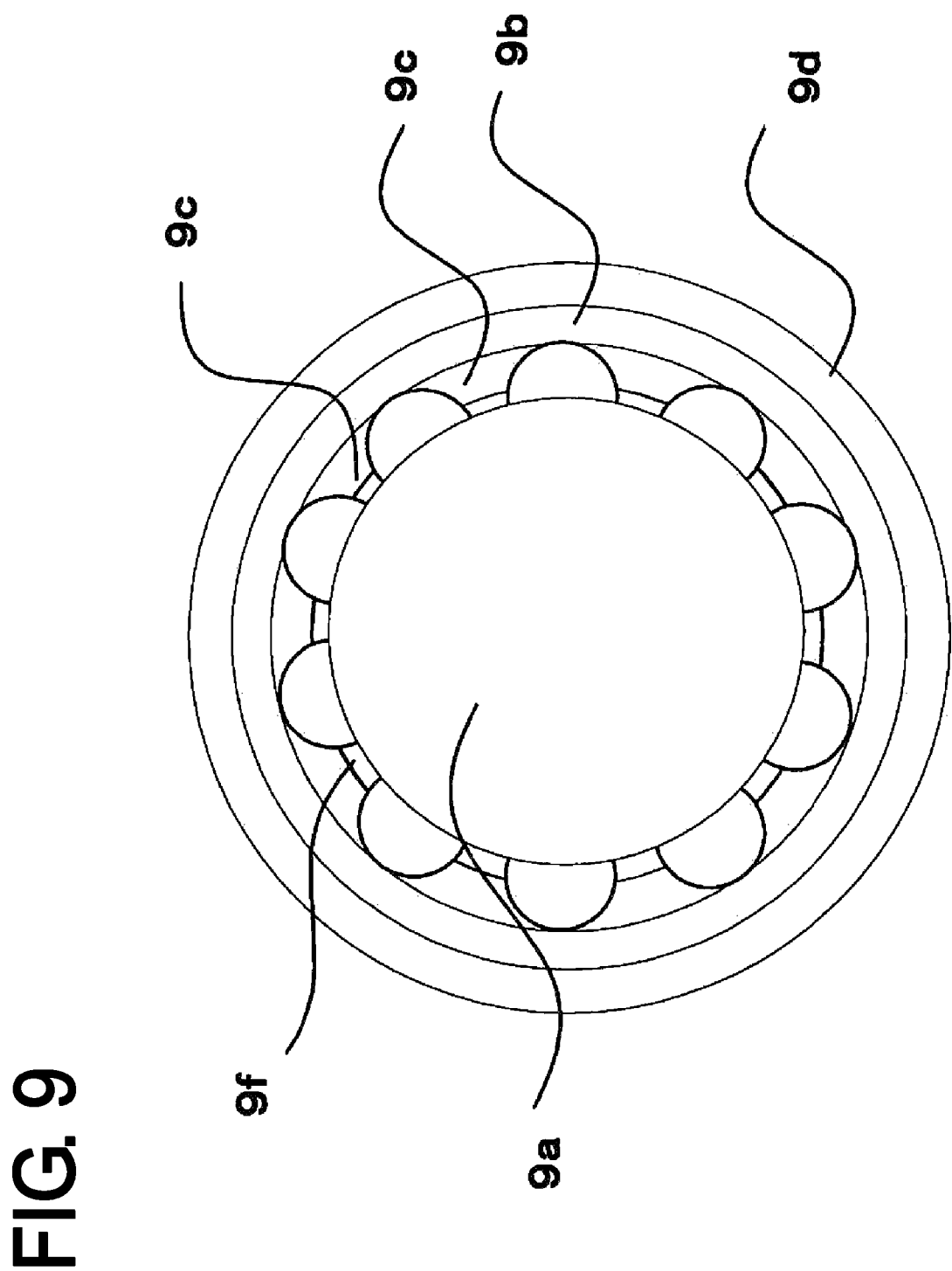
FIG. 9 is a plan view of the vicinity of a through-hole of a negative electrode terminal plate used for a prismatic secondary battery according to a modification.

As shown in FIG. 6c, the height of the second protruding part 9c is preferably lower than that of the first protruding part 9b. At least one second protruding part 9c may be provided. A plurality of second protruding parts 9c are preferably provided at intervals so as to encircle the through-hole 9a. Furthermore, as shown in FIG. 6A, more preferably, the second protruding parts 9c are radially provided so as to extend to the first protruding part 9b from the through-hole 9a. The second protruding part 9c is more preferably connected to the first protruding part 9b in order to maintain the strength of the second protruding part 9c. The width of the second protruding part 9c (the width of a circumferential section concentric to the through-hole 9a) is constant in FIG. 6A. However, as shown in FIG. 9, the width can be gradually decreased toward the through-hole 9a from the first protruding part 9b side. The width can be gradually increased toward the through-hole 9a from the first protruding part 9b side. The shape of the circumferential section concentric to the through-hole 9a of the second protruding part 9c is not particularly limited. However, the shape is particularly preferably a trapezoid or a triangle. Each side may not be a straight line, or a corner part thereof may be chamfered or rounded.

As shown in FIGS. 6A to 6C, an annular step part 9d is provided outside the first protruding part 9b. The connecting part of the negative electrode terminal member 8 and the negative electrode terminal plate 9 is formed in a recessed portion in the negative electrode terminal plate 9. This can prevent the breakage and damage of the connecting part caused by the contact of a jig or a part or the like to the connecting part. Herein, the height of a wall part in the step part 9d is made higher than that of the first protruding part 9b.

A taper part 9f having a diameter widened toward the upper side is provided on the upper end part side of the through-hole 9a. This can prevent stress concentration on a bending part of the second connecting part 9c, which results in improvements in tensile strength and rotation strength. A variation in the thickness of the swaged part 9d of the second connecting part 9c can be suppressed.

The bolt 13 is inserted into and fixed to a bolt insertion hole 9e. The bolt 13 is provided in order to fix a bus bar for connecting a plurality of prismatic secondary batteries 30 in series or in parallel, and wiring for external connection, or the like, with a bolt (not shown).

Figure 7A:
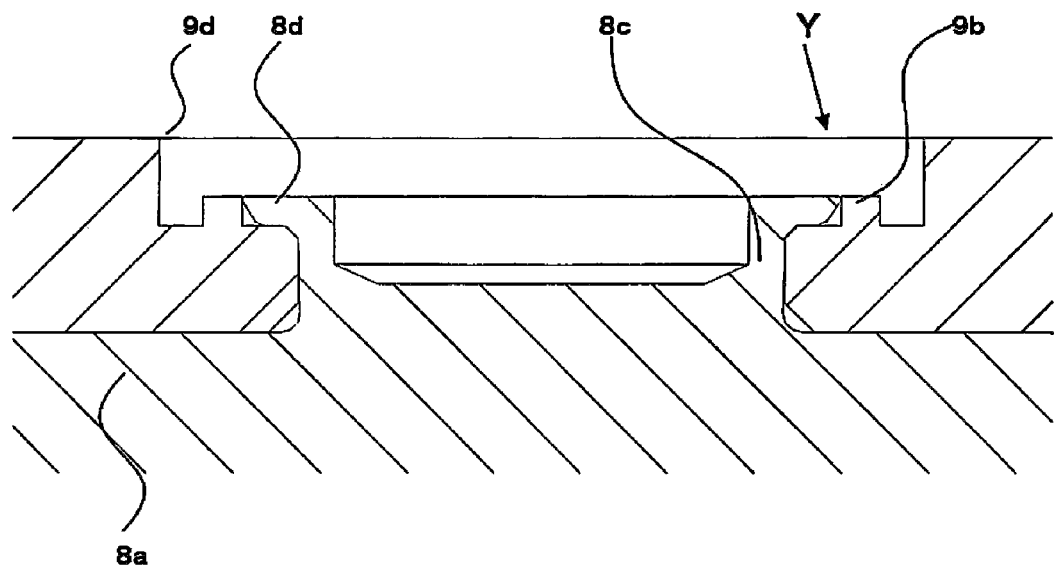
FIG. 7A shows a state where a second connecting part of a negative electrode terminal member is inserted into a through-hole of a negative electrode terminal plate, and a tip of the second connecting part is swaged.
Figure 7B:
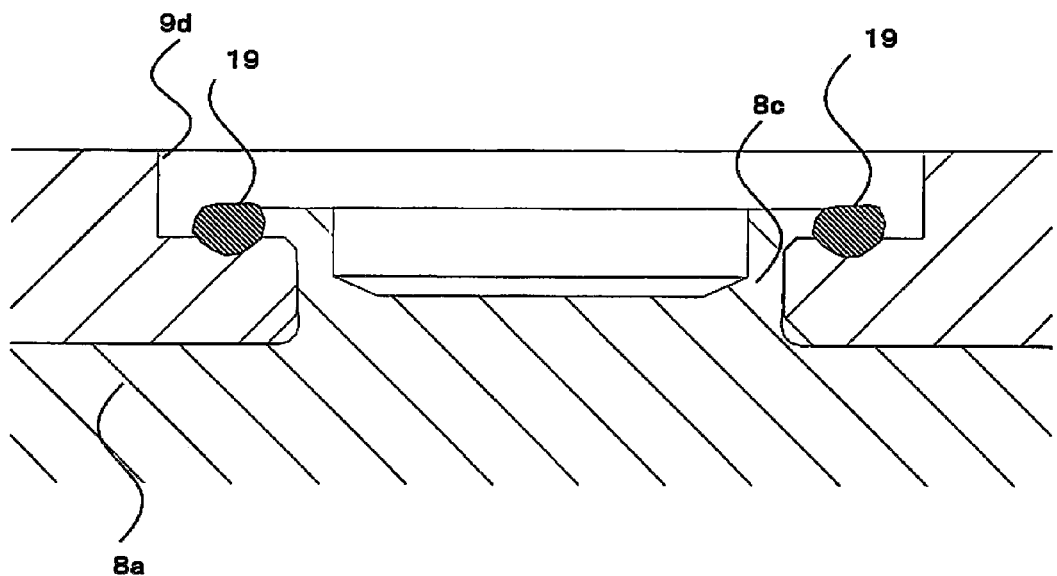
FIG. 7B shows a state where an abutting part of a tip of a swaged part of the second connecting part of the negative electrode terminal member and the negative electrode terminal plate is welded.

Next, a method for connecting the negative electrode terminal member 8 and the negative electrode terminal plate 9 to each other will be described in detail. The cylindrical second connecting part 8c is inserted into the through-hole 9a of the negative electrode terminal plate 9, and the tip of the second connecting part 8c is swaged on the negative electrode terminal plate 9 by spinning swaging. Thereby, as shown in FIGS. 7A and 8, the swaged part 8d of the second connecting part 8c covers the second protruding part 9c, and the tip of the swaged part 8d of the second connecting part 8c abuts on the side surface of the first protruding part 9b. Then, as shown in FIG. 7B, in a range in which the second protruding part 9c is not formed, the abutting part of the tip of the swaged part 8d of the second connecting part 8c and the first protruding part 9b is irradiated with laser beams to weld the abutting part. Herein, an upper surface of the tip of the swaged part 8*d* of the second connecting part 8*c* and an upper surface (tip side surface) of the first protruding part 9*b* are preferably made to be on the same plane in an unwelded-state after swaging. Thereby, the welded part is more stably formed. The upper surface of the tip of the swaged part 8*d* of the second connecting part 8*c* and the upper surface of the first protruding part 9*b* can be made to be on the same plane by adjusting a height of the second connecting part 8*c* before swaging, a thickness of the second connecting part 8*c* before swaging, or a distance between the through-hole 9*a* and the first protruding part 9*b*, or the like. The swaging is not limited to the spinning swaging. However, the second connecting part 8*c* of the negative electrode terminal member 8 can be firmly swage-fixed to the negative electrode terminal plate 9 even without applying a large force according to the spinning swaging. Thereby, a large force is not applied to the sealing body 15 and the insulating member 11 or the like. These are less likely to be deformed or broken. The abutting part of the tip of the swaged part 8*d* of the second connecting part 8*c* and the first protruding part 9*b* can be welded in the range in which the second protruding part 9*c* is formed.

[Modification]

Figure 10A:
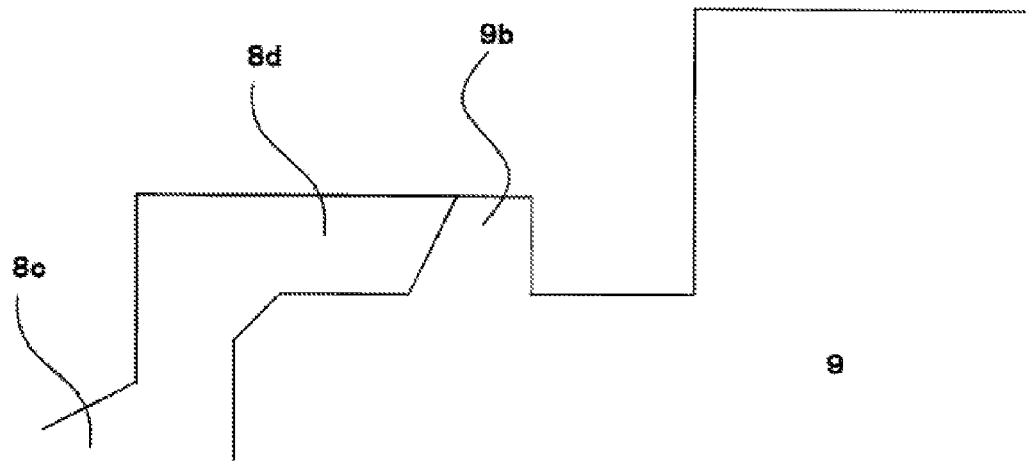
FIG. 10 is an enlarged sectional view of a portion corresponding to a portion represented by Y in FIG. 7A for the negative electrode terminal plate used for the prismatic secondary battery according to the modification.
Figure 10B:
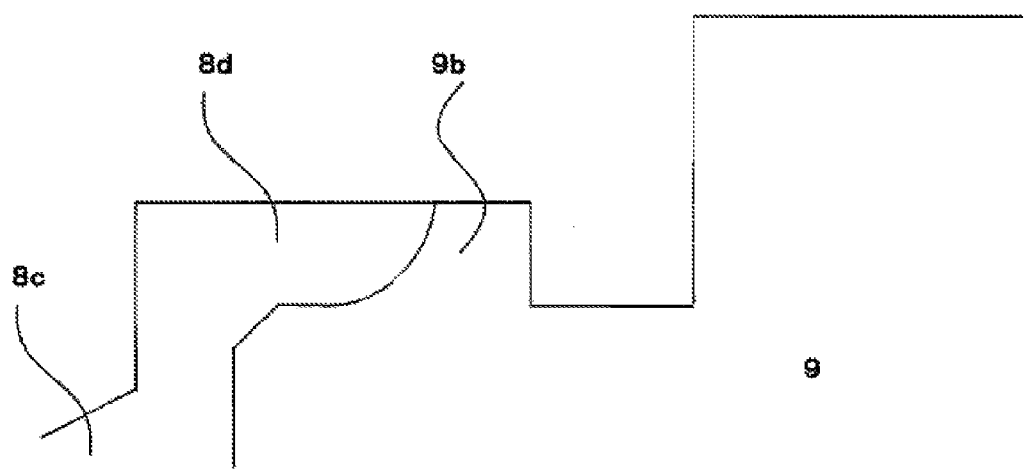

In the prismatic secondary battery 30 according to the above embodiment, an example is shown, wherein the side surface of the first protruding part 9*b* located on the through-hole 9*a* side is perpendicular to the surface on which the first protruding part 9*b* of the negative electrode external terminal 9 is provided. However, as shown in FIGS. 10A and 10B, the side surface of the first protruding part 9*b* located on the through-hole 9*a* side is preferably an inclined surface (FIG. 10A) or a curved surface (FIG. 10B). As shown in FIGS. 10A and 10B, the tip of the swaged part 8*d* and the first protruding part 9*b* may be weld-connected by laser welding or the like after the second connecting part 8*c* is swaged.

The tip of the swaged part 8*d* of the second connecting part 8*c* is likely to have such a shape that the upper side (the tip side of the first protruding part 9*b*) protrudes to the first protruding part 9*b* side than the lower side (the base side of the first protruding part 9*b*). Therefore, when the side surface of the first protruding part 9*b* located on the through-hole 9*a* side is perpendicular to the surface of the negative electrode external terminal 9 on which the first protruding part 9*b* is provided, a gap may be generated between the tip of the swaged part 8*d* of the second connecting part 8*c* and the base portion of the first protruding part 9*b*. When the gap exists, cracks and voids are possibly generated in the welded part. On the other hand, the side surface of the first protruding part 9*b* located on the through-hole 9*a* side is the inclined surface or the curved surface. This can prevent the gap from being generated between the tip of the swaged part 8*d* of the second connecting part 8*c* and the base portion of the first protruding part 9*b*. Therefore, the generation of the cracks and the voids can be prevented in the welded part formed between the tip of the swaged part 8*d* of the second connecting part 8*c*, and the first protruding part 9*b*.

In the prismatic secondary battery 30 according to the above embodiment, the terminal plate in which the external conduction member is disposed on the sealing body 15 with the terminal holder 24 interposed therebetween is showed as an example. However, the external conduction member is not limited to the terminal plate. For example, the bus bar connecting the positive electrode terminal members and negative electrode terminal members of the prismatic secondary batteries adjacent to each other in an assembled battery may be the external conduction member. In this case, the positive electrode terminal member is connected to the through-hole provided on one end side of the bus bar, and the negative electrode terminal member is connected to the through-hole provided on the other side end side.

In the present invention, the terminal member and the external conduction member are preferably welded by application of energy beams. Laser beams and electronic beams or the like are preferably used.

The negative electrode terminal member 8 and the negative electrode terminal plate 9 preferably include a member mainly made of copper. Particularly, the negative electrode terminal plate 9 preferably has a surface on which a covering layer made of nickel or the like is formed.

The constitution of the connecting part of the collector and the terminal member, and the constitution of the connecting part of the terminal member and the terminal plate are described by using the negative electrode side as an example in the prismatic secondary battery 30 according to the above embodiment. However, the positive electrode side also may have the same constitution. For the positive electrode side, the positive electrode terminal member 4 and the positive electrode terminal plate 5 are preferably mainly made of aluminium.

The constitution of the connecting part of the terminal member and the external conduction member may be applied to at least one of the negative electrode side and the positive electrode side. The constitution may be applied to both the negative electrode side and the positive electrode side.

The prismatic secondary battery is not limited to a non-aqueous electrolyte secondary battery, and can also be applied to an alkali secondary battery. The prismatic secondary battery of the present invention is not limited to an on-vehicle secondary battery, and can be used for stationary storage battery systems in applications for suppressing output variation of photovoltaic power generation and wind power generation or the like, and in grid power peak load shifting applications for storing power at night and using it in the daytime.

What is claimed is:

1. A prismatic secondary battery, comprising:
    an electrode assembly including a positive electrode plate and a negative electrode plate;
    an outer casing having a mouth and housing the electrode assembly;
    a sealing body having a through-hole and sealing the mouth of the outer casing;
    a terminal member electrically connected to the positive electrode plate or the negative electrode plate and penetrating the through-hole of the sealing body;
    an external conduction member having a through-hole and connected to the terminal member; and
    an insulating member interposed between the terminal member and the sealing body,
    wherein the terminal member includes a flange, a first connecting part formed on a first surface side of the flange, and a second connecting part formed on a second surface side of the flange,
    the flange and the second connecting part are disposed on a battery exterior side than the sealing body,
    the first connecting part penetrates the through-hole of the sealing body,
    the second connecting part is inserted into the through-hole of the external conduction member, and includes a tip part swaged on the external conduction member,
    an abutting part of a tip of the swaged part of the second connecting part and the external conduction member is weld-connected, a first protruding part is provided around the through-hole on a surface of the external conduction member opposite to the sealing body side, an outer end of the swaged part of the second connecting part in a diameter expansion direction contacts with the first protruding part, an abutting part of the outer end of the swaged part of the second connecting part in a diameter expansion direction and the first protruding part is weld-connected, wherein a second protruding part is provided in the vicinity of the through-hole on a surface of the external conduction member opposite to the sealing body side, and the swaged part of the second connecting part covers the second protruding part, wherein a through-hole side end part of the external conduction member of the second protruding part has an inclined surface, an upper end of the through-hole of the external conduction member has an inclined surface, the inclined surface of the second protruding part and the inclined surface of the upper end of the through-hole of the external conduction member are continuously formed.

2. The prismatic secondary battery according to claim 1, wherein
each of the second protruding part is radially provided, and
the first protruding part and the plurality of second protruding parts are continuously formed.

3. The prismatic secondary battery according to claim 1, wherein the shortest distance between the through-hole of the external conduction member and the plurality of second protruding parts is shorter than that between the through-hole of the external conduction member and the first protruding part.

4. The prismatic secondary battery according to claim 1, wherein a step part encircling the first protruding part is provided outside the first protruding part of the external conduction member.

5. The prismatic secondary battery according to claim 1, wherein a height of the second protruding part is lower than that of the first protruding part.

6. The prismatic secondary battery according to claim 1, wherein the second protruding part is provided on the through-hole side of the external conduction member than the first protruding part.

7. The prismatic secondary battery according to claim 1, wherein:
the first protruding part has an annular shape in a planar view,
the step part has an annular shape in a planar view, a vertical wall spreading vertically, and an upper surface projecting in a horizontal direction from the upper end of the vertical wall,
the upper end of the first protruding part is lower than the upper surface of the step part,
the first protruding part is spaced apart from the vertical wall of the step part in the horizontal direction.

8. A prismatic secondary battery, comprising:
an electrode assembly including a positive electrode plate and a negative electrode plate;
an outer casing having a mouth and housing the electrode assembly;
a sealing body having a through-hole and sealing the mouth of the outer casing;
a terminal member electrically connected to the positive electrode plate or the negative electrode plate and penetrating the through-hole of the sealing body;
an external conduction member having a through-hole and connected to the terminal member; and
an insulating member interposed between the terminal member and the sealing body,
wherein the terminal member includes a flange, a first connecting part formed on a first surface side of the flange, and a second connecting part formed on a second surface side of the flange,
the flange and the second connecting part are disposed on a battery exterior side than the sealing body,
the first connecting part penetrates the through-hole of the sealing body,
the second connecting part is inserted into the through-hole of the external conduction member, and includes a tip part swaged on the external conduction member,
an abutting part of a tip of the swaged part of the second connecting part and the external conduction member is weld-connected,
a first protruding part is provided around the through-hole on a surface of the external conduction member opposite to the sealing body side,
an outer end of the swaged part of the second connecting part in a diameter expansion direction contacts with the first protruding part,
an abutting part of the outer end of the swaged part of the second connecting part in a diameter expansion direction and the first protruding part is weld-connected,
the first protruding part has an annular shape in a planar view,
the external conduction member includes a plurality of second protruding parts provided on a surface opposite to the sealing body,
each of the second protruding parts is nearer to the through-hole of the external conduction member than the first protruding part,
the first protruding part has a height higher than that of each of the second protruding parts,
the plurality of the second protruding parts is covered with the swaged portion of the second connecting part,
the first protruding part has a portion which is not covered with the swaged portion of the second connecting part,
each of the second protruding parts is provided between the first protruding part and the through-hole of the external conductive member,
a through-hole side end part of the external conduction member of the second protruding part has an inclined surface,
an upper end of the through-hole of the external conduction member has an inclined surface,
the inclined surface of the second protruding part and the inclined surface of the upper end of the through-hole of the external conduction member are continuously formed.

9. The prismatic secondary battery according to claim 8, wherein a step part encircling the first protruding part is provided outside the first protruding part of the external conduction member.

10. The prismatic secondary battery according to claim 8, wherein:
the first protruding part has an annular shape in a planar view, the step part has an annular shape in a planar view, a vertical wall spreading vertically, and an upper surface projecting in a horizontal direction from the upper end of the vertical wall, the upper end of the first protruding part is lower than the upper surface of the step part, the first protruding part is spaced apart from the vertical wall of the step part in the horizontal direction.

11. A prismatic secondary battery, comprising:

an electrode assembly including a positive electrode plate and a negative electrode plate;

an outer casing having a mouth and housing the electrode assembly;

a sealing body having a through-hole and sealing the mouth of the outer casing;

a terminal member electrically connected to the positive electrode plate or the negative electrode plate and penetrating the through-hole of the sealing body;

an external conduction member having a through-hole and connected to the terminal member; and an insulating member interposed between the terminal member and the sealing body, wherein the terminal member includes a flange, a first connecting part formed on a first surface side of the flange, and a second connecting part formed on a second surface side of the flange, the flange and the second connecting part are disposed on a battery exterior side than the sealing body, the first connecting part penetrates the through-hole of the sealing body, the second connecting part is inserted into the through-hole of the external conduction member, and includes a tip part swaged on the external conduction member, an abutting part of a tip of the swaged part of the second connecting part and the external conduction member is weld-connected, a first protruding part is provided around the through-hole on a surface of the external conduction member opposite to the sealing body side, the swaged part of the second connecting part has an outer end in a diameter expansion direction, the outer end of the swaged part contacts with the first protruding part, and an abutting part of the tip of the swaged part of the second connecting part and the first protruding part is weld-connected, the first protruding part has an annular shape in a planar view, the external conduction member includes a plurality of second protruding parts provided on a surface opposite to the sealing body, the first protruding part has a height higher than that of each of the second protruding parts, the plurality of the second protruding parts is covered with the swaged portion of the second connecting part, the first protruding part has a portion which is not covered with the swaged portion of the second connecting part, each of the second protruding parts is provided between the first protruding part and the through-hole of the external conductive member, and the first protruding part and the plurality of second protruding parts are continuously formed.

12. The prismatic secondary battery according to claim 11, wherein each of the second protruding part is radially provided.

13. The prismatic secondary battery according to claim 11, wherein the shortest distance between the through-hole of the external conduction member and the plurality of second protruding parts is shorter than that between the through-hole of the external conduction member and the first protruding part.

14. The prismatic secondary battery according to claim 11, wherein the whole of the upper surface of the first protruding part is substantially formed flush.

15. The prismatic secondary battery according to claim 11, wherein a step part encircling the first protruding part is provided outside the first protruding part of the external conduction member.

16. The prismatic secondary battery according to claim 11, wherein the first protruding part has an annular shape in a planar view, the step part has an annular shape in a planar view, a vertical wall spreading vertically, and an upper surface projecting in a horizontal direction from the upper end of the vertical wall, the upper end of the first protruding part is lower than the upper surface of the step part, the first protruding part is spaced apart from the vertical wall of the step part in the horizontal direction.

* * * * *